Sept. 30, 1924.
L. PACE
1,510,102
SIGNAL DEVICE FOR VEHICLES
Filed Dec. 23, 1922    2 Sheets-Sheet 1
Fig.1.
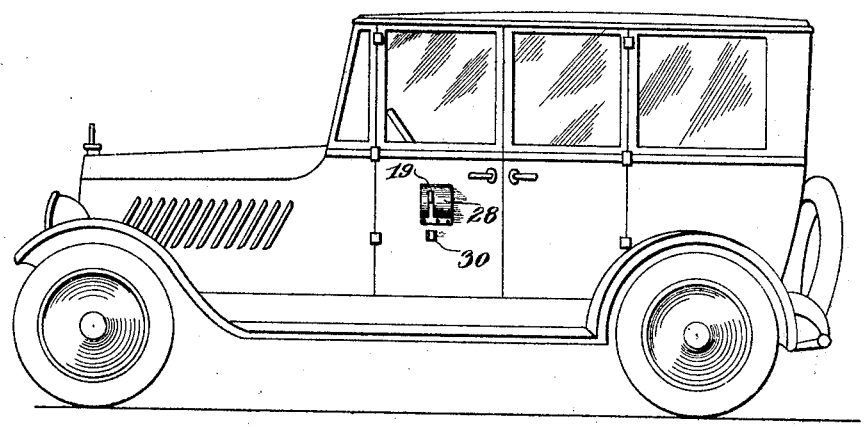
Fig.2.
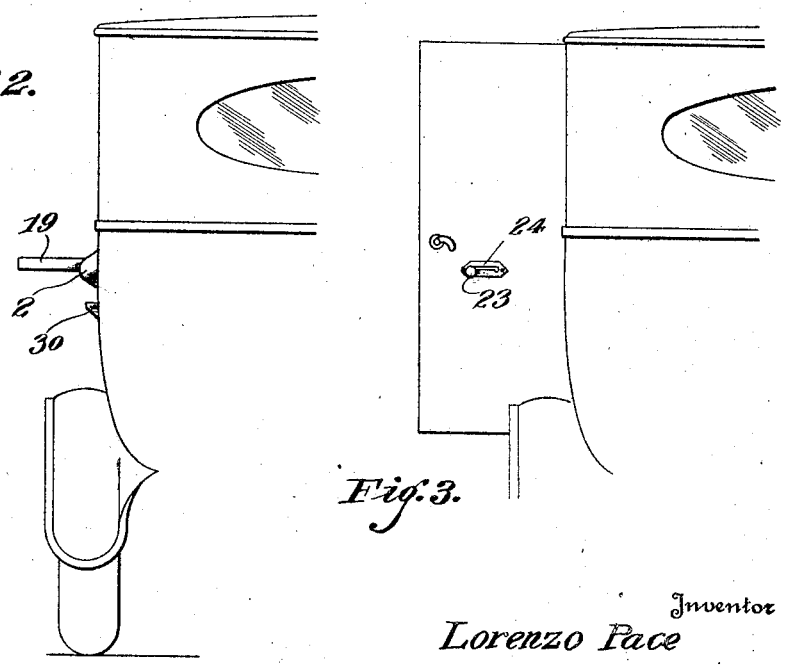
Fig.3.
Inventor
Lorenzo Pace
By Mason, Fenwick & Lawrence
Attorneys.

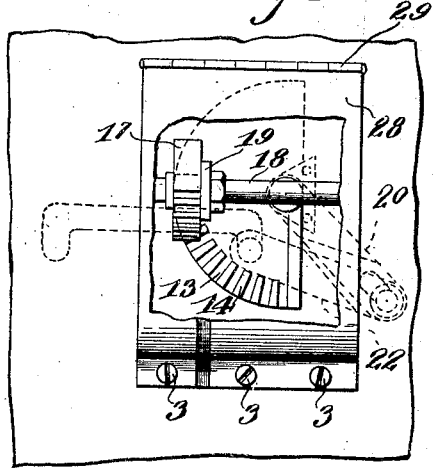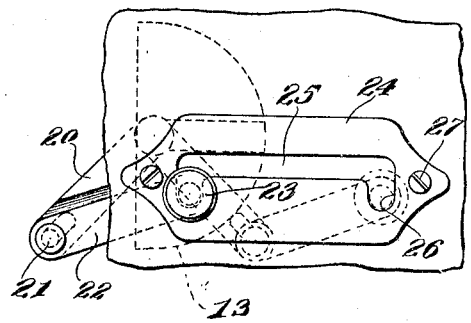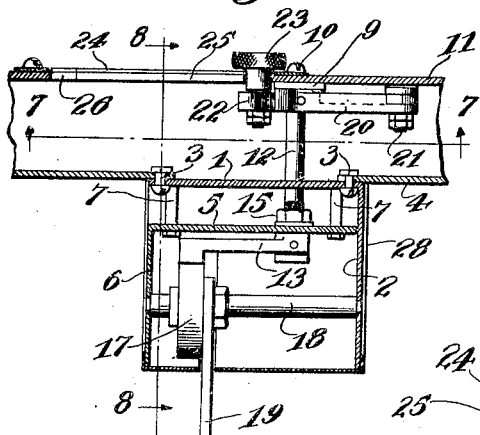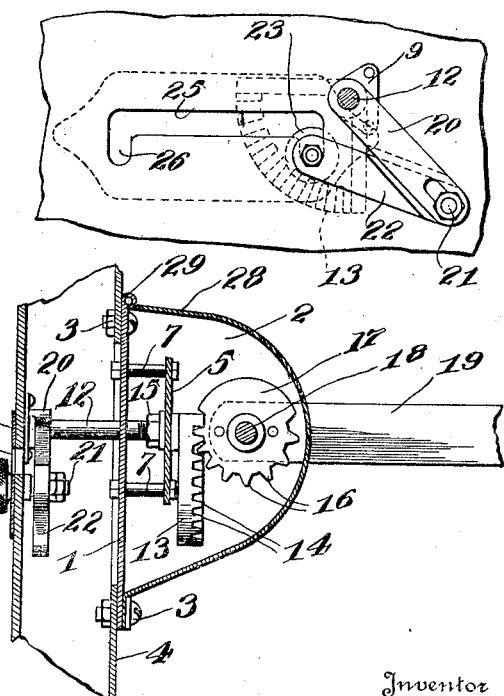

Patented Sept. 30, 1924.

1,510,102

UNITED STATES PATENT OFFICE.

LORENZO PACE, OF ALLENTOWN, PENNSYLVANIA.

SIGNAL DEVICE FOR VEHICLES.

Application filed December 23, 1922. Serial No. 608,660.

*To all whom it may concern:*

Be it known that I, LORENZO PACE, a subject of the King of Italy, residing at Allentown, in the county of Lehigh and State of Pennsylvania, have invented certain new and useful Improvements in Signal Devices for Vehicles; and I do hereby declare the following to be a full, clear, and exact description of the invention, such as will enable others skilled in the art to which it appertains to make and use the same.

This invention relates to signal devices for vehicles and, more particularly, a signal device for closed vehicles such as sedans and the like.

The object of the present invention is to provide a device of the character indicated operable from within the vehicle by slight and direct linear movement of an operative member. Further objects of the invention are to provide locking means preventing the operation of the device from without the vehicle or the tampering therewith and the provision of a simplified mechanism for the positive transmission of motion from the operating member to the signal member.

Two sheets of drawings accompany this specification as part thereof in which like reference characters indicate similar parts throughout.

Figure 1 is a side elevation of an automobile showing the present device attached;

Fig. 2 is a fragmentary rear elevation showing the device with the signal member in operative or elevated position;

Fig. 3 is a view similar to Fig. 2 showing the door to which the device is attached open and the interior operating mechanism;

Fig. 4 is a front elevation view of the device partly broken away to illustrate details;

Fig. 5 is a back or inside view of the device attached, the door frame being broken away;

Fig. 6 is a horizontal sectional view through the device as attached;

Fig. 7 is a vertical sectional view taken on line 7—7 of Fig. 6; and

Fig. 8 is a vertical sectional view taken on line 8—8 of Fig. 6.

In accordance with the present invention a base plate 1 (see Fig. 6) is provided having an outturned flange 2 and adapted to be secured to the outer panel 4 of the door or body of the vehicle as by bolts 3. A second base plate 5 is secured parallel with and spaced from plate 1 by spacing bolts 7, the plate 5 being also provided with an outwardly turned flange 6. A spindle 18 is supported in suitable journals or holes provided in the flanges 2 and 6 so as to lie in a horizontal plane and substantially parallel with the base plates 1 and 5. Fixedly secured to spindle 18 is a signal member 19 and a gear 17.

A spindle 12 is journalled in suitable bearings or holes in base plates 1 and 5 and has fixedly secured to its outer end a gear segment 13, here shown as a crown gear, the teeth 14 of which are adapted to mesh with the teeth 16 of gear 17 previously mentioned. The other or inner end of spindle 12 is supported in a suitable journal provided in a plate 9 adapted to be secured within the door or body structure of the vehicle and upon its inner panel and adjacent said bearing a lever 20 is fixedly secured to said spindle. A link 22 is pivotally connected as by bolt 21 with the free end of lever 20 and to the other end of link 22 is secured operative member 23 which is here illustrated as a knob. The operative member 23 extends inwardly through the inner panel 11 of the door or body of the vehicle and is guided by means of a slotted escutcheon 24 secured upon the inner face of the door or vehicle body. The slot 25 of escutcheon 24 extends horizontally and is provided at its ends with downwardly directed lateral detents 26 adapted to receive the operative member 23 at the ends of its operative strokes and to prevent further horizontal movement of said operative member 23 in either direction until it has been lifted from said detents into alinement with the horizontal slot.

A cover 28 is provided hingedly connected to base plate 1 as as 29 and secured therewith to the car by bolts 3 as illustrated in Fig. 8, said cover 28 being provided with a suitable vertical slot to permit the vertical movement of the signal member 19 therethrough. A U-shaped keeper 30 is preferably attached to the vehicle below signal member 19 to receive the signal member in its down or inoperative position and protect the same from lateral strains.

Referring to Figs. 5 and 6, the operation of the device can be readily followed, the horizontal movement of operative member 23 through slot 25 rotating spindle 12 by means of lever 20 and link 22 and the rotation of spindle 12 in turn rotating spindle 18 through gears 13 and 17 thus swinging signal member 19 as desired from its vertical to its horizontal position and vice versa as desired, the signal member being held in either its vertical or horizontal position by the dropping of operative member 23 into the detents 26 (see Fig. 7).

Having thus fully described my invention, I claim:

A signal device for vehicles comprising a frame, a shaft, a gear segment fixed to the shaft, a signal arm fixed to the shaft, a second shaft mounted in the frame perpendicular to the first shaft, a gear segment secured to the second shaft adapted to engage the gear segment secured to the first shaft, a lever secured to the second shaft, a reciprocable operating member, a link connecting the operating member with the lever, and a guide for the operating member, said guide provided with an offset detent adjacent each end as and for the purposes specified.

In testimony whereof I affix my signature.

LORENZO PACE.